United States Patent
Boutwell et al.

[19]

[11] Patent Number: 5,908,020
[45] Date of Patent: Jun. 1, 1999

[54] MARINE FUEL PUMP AND COOLING SYSTEM

[75] Inventors: Rodney K. Boutwell; Ralph E. Ulm, both of Fairfield, Ill.

[73] Assignee: UIS, Inc., Jersey City, N.J.

[21] Appl. No.: 09/114,445

[22] Filed: Jul. 13, 1998

[51] Int. Cl.⁶ .................................................. F02M 31/20
[52] U.S. Cl. ........................ 123/541; 123/41.31; 123/509
[58] Field of Search ................... 123/509, 41.31, 123/514, 510, 541, 497

[56] References Cited

U.S. PATENT DOCUMENTS

| | | | |
|---|---|---|---|
| 3,835,822 | 9/1974 | Mickle | 123/41.31 |
| 3,973,536 | 8/1976 | Zelders | 123/541 |
| 4,084,564 | 4/1978 | Rickert | 123/541 |
| 4,689,025 | 8/1987 | Ferguson | 123/41.31 |
| 4,728,306 | 3/1988 | Schneider | 123/541 |
| 4,768,492 | 9/1988 | Widmer | 123/541 |
| 4,848,283 | 7/1989 | Grams | 123/541 |
| 4,980,588 | 12/1990 | Ogawa | 123/41.31 |
| 5,015,159 | 5/1991 | Mine | 123/41.31 |
| 5,046,471 | 9/1991 | Schmid | 123/510 |
| 5,103,793 | 4/1992 | Reise | 123/510 |
| 5,231,967 | 8/1993 | Baltz et al. | |
| 5,438,962 | 8/1995 | Iwatas | 123/541 |
| 5,647,330 | 7/1997 | Sawert | 123/509 |
| 5,647,331 | 7/1997 | Swanson | 123/509 |
| 5,694,895 | 12/1997 | Tsunoda | 123/41.31 |

*Primary Examiner*—Carl S. Miller
*Attorney, Agent, or Firm*—Polster, Lieder, Woodruff & Lucchesi, L.C.

[57] ABSTRACT

An integrated fuel system component (10) comprising a fuel pump (52), a fuel filter (30) axially mounted directly below and around the lower portion of the fuel pump, and a spiral-wound fuel line (84) composed of a heat-conductive material mounted concentric to the upper portion of the fuel pump, minimizing the space required for installation. A fuel cooling system encloses the pump housing (70) and the fuel line in sealed chambers (66, 68) through which a liquid coolant is circulated to cool both the fuel pump and the fuel contained within the fuel line. A fuel pressure regulator (104) located between the fuel line and a fuel outlet (100) returns fuel to a fuel reservoir (24) located below the fuel filter, thereby providing a closed loop system. By combining the fuel pump, fuel filter, liquid cooling system, and pressure regulator into a single unit, the integrated unit minimizes vapor lock induced by heat, and optimally houses the fuel system components within a minimal volume of space.

13 Claims, 3 Drawing Sheets

MARINE FUEL PUMP AND COOLING SYSTEM

BACKGROUND OF THE INVENTION

This invention relates to fuel delivery components for use with water-cooled internal combustion engines in a marine environment, and more specifically to a water-cooled fuel pump, fuel filter, and fuel-pressure regulator assembly.

Generally, internal combustion engine propulsion systems adapted for marine use are water-cooled, and external engine components are housed within sealed enclosures to prevent moisture damage. Typically during operation, these components generate excess heat which may damage the components if not dissipated, a condition which is exacerbated by the sealed enclosures within which the components are housed. The need to reduce the volume of space on a marine craft occupied by the engine and its associated components has led to the development of multi-functional engine components which combine several individual components into a single sealed enclosure or housing. However, as engine components are grouped together, other problems may arise, for example, in fuel system components, the problems of excess heat dissipation and vapor lock must be addressed.

Several dual component combinations for use with internal combustion engine fuel systems are shown in the prior art. For example, U.S. Pat. No. 3,835,822, to Mickle et al., discloses directing a cooling water supply around a heat sink and fuel pump enclosed within a sealed housing, thereby cooling fuel pump and the fuel flowing within. By cooling the fuel pump and the fuel, the risk of vapor lock conditions in the fuel lines caused by excessive heat is reduced. However, as shown in the '822 patent, the heat sink abuts only the outer surface of the fuel pump, and is not configured to optimally cool the fuel itself.

Similarly, U.S. Pat. No. 5,231,967, to Baltz et al., discloses mounting a fuel pump and coaxially aligned fuel filter directly to an engine block by use of a housing. The fuel pump is located downstream from the fuel filter in the fuel system, and the filter is mounted such that the configuration simplifies maintenance and shields the underside of the fuel pump from fire. While this configuration is useful in minimizing space occupied in the engine compartment by the fuel filter and fuel pump, the proximity of the units to the engine block can lead to problem with dissipation of excess heat generated by the fuel pump, and the absorption of heat directly from the engine block.

U.S. Pat. No. 5,647,331, to Swanson discloses a device in which a liquid-cooled fuel pump incorporates a vapor separator module to reduce vapor lock created by both the absorption of excess heat in the fuel, and the vibration associated with the operation of marine internal combustion engines. The '331 device directs a liquid coolant over a casing comprising modular cavities, one cavity being a fuel reservoir and another cavity housing the fuel pump. The fuel reservoir is bathed by the coolant prior to fuel entering the pump, thereby reducing the intake temperature of the fuel. The device disclosed in the '331 patent is remotely located from both the tank and the engine and hence requires additional enclosures within the boat hull, and additional fuel lines. This to the complexity of the boat, both in building and servicing, Accordingly, in the attempt to reduce the amount of space occupied by components of marine propulsion systems, and in particular, internal combustion engines, there is need for a combination fuel pump, fuel filter, and fuel regulator capable dissipating excess heat to reduce the occurrence of fuel system vapor lock.

BRIEF SUMMARY OF THE INVENTION

Among the several objects and advantages of the present invention are:

The provision of an into fuel system component which includes a fuel pump, a fuel filter, and a liquid coolant system configured to optimally cool the fuel pump and fuel flowing therethrough;

The provision of the aforementioned integrated fuel system component wherein the cooling system is configured such that the fuel flowing therethrough is cooled after exiting the fuel pump;

The provision of the aforementioned fuel system component wherein the cooling system is configured to minimize heat induced vapor lock in the fuel;

The provision of the aforementioned integrated fuel system component further including a fuel-rail pressure regulator configured for over-pressure fuel recovery;

The provision of the aforementioned integrated fuel system component wherein the arrangement and packaging of the fuel pump, fuel filter, cooling system, and fuel pressure regulator is housed within a sealed enclosure;

The provision of the aforementioned integrated fuel system component wherein the sealed enclosure is adapted for mounting on the block of an internal combustion engine; and The provision of the aforementioned integrated fuel system component configured to minimize the space required for installation of the housing of an internal combustion engine.

Briefly stated, the present invention combines, into a single integrated unit suitable for mounting on any size marine engine, several fuel system components. The integrated unit incorporates a fuel pump, a fuel filter axially mounted directly below and around the lower portion of the fuel pump, and spiral-wound fuel line compound of a heat-conductive material mounted concentric to the upper portion of the fuel pump, thus minimizing the space required for installation. To provide cooling for both the fuel pump and the fuel flowing in the fuel line, a fuel cooling system encloses the pump housing and the fuel line in a sealed chamber through which a liquid coolant is circulated. Because the fuel flows through the cooling system after exiting the fuel pump, heat imparted to the fuel by the operation of the fuel pump is dissipated into the liquid coolant. In the event an over pressure condition arises in the fuel line or fuel rail, a fuel pressure regulator located between the fuel line and the fuel rail returns fuel to a fuel bowl located below the fuel filter, thereby providing a closed loop system. By combining the fuel pump, fuel filter, liquid cooling system, and pressure regulator into a single unit, the resulting integrated unit minimizes vapor lock induced by heat, and optimally houses the fuel system components within a minimal volume of space.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

Figure 1:
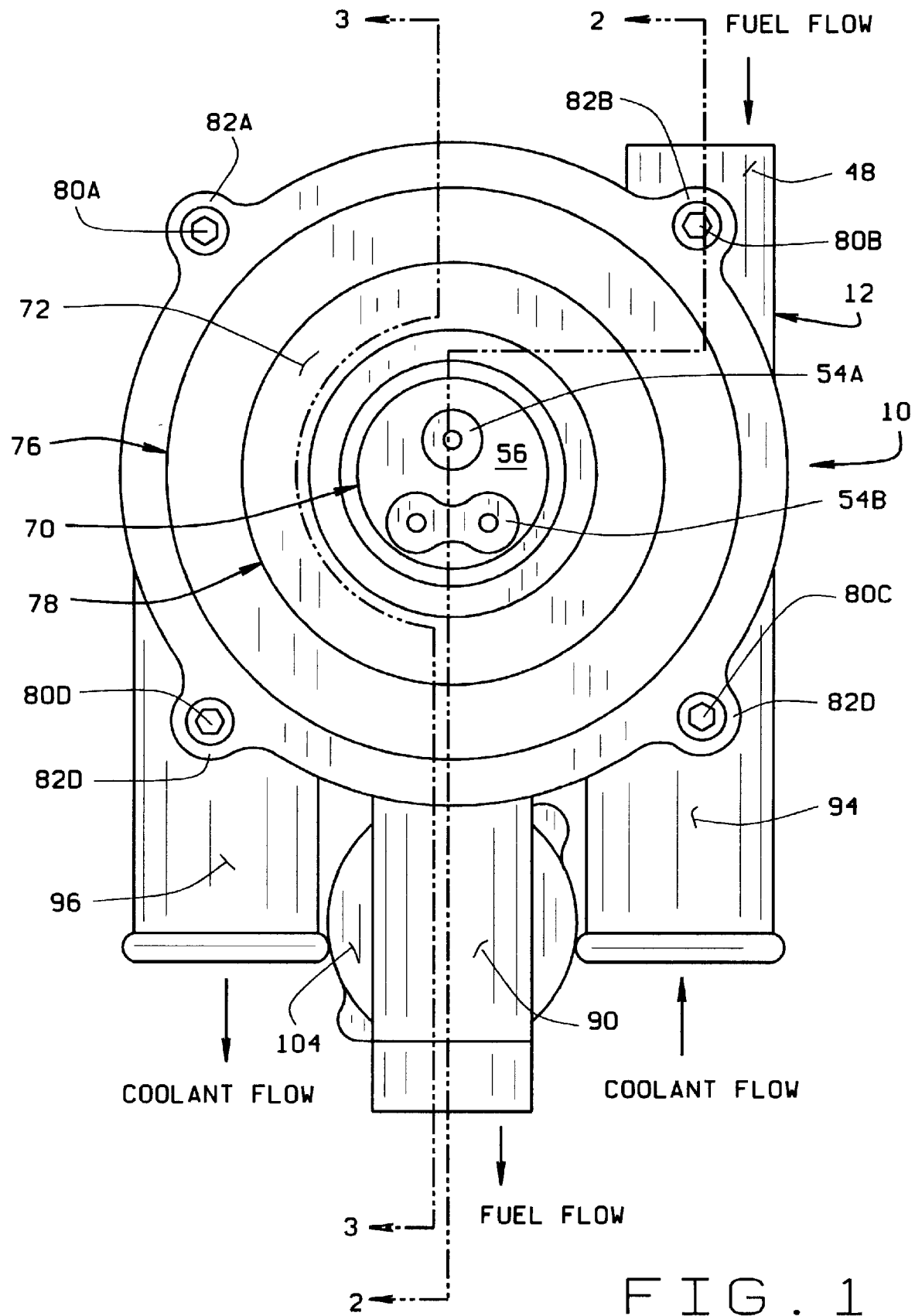
FIG. 1 is a top plan view of the integrated fuel pump unit.
Figure 2:
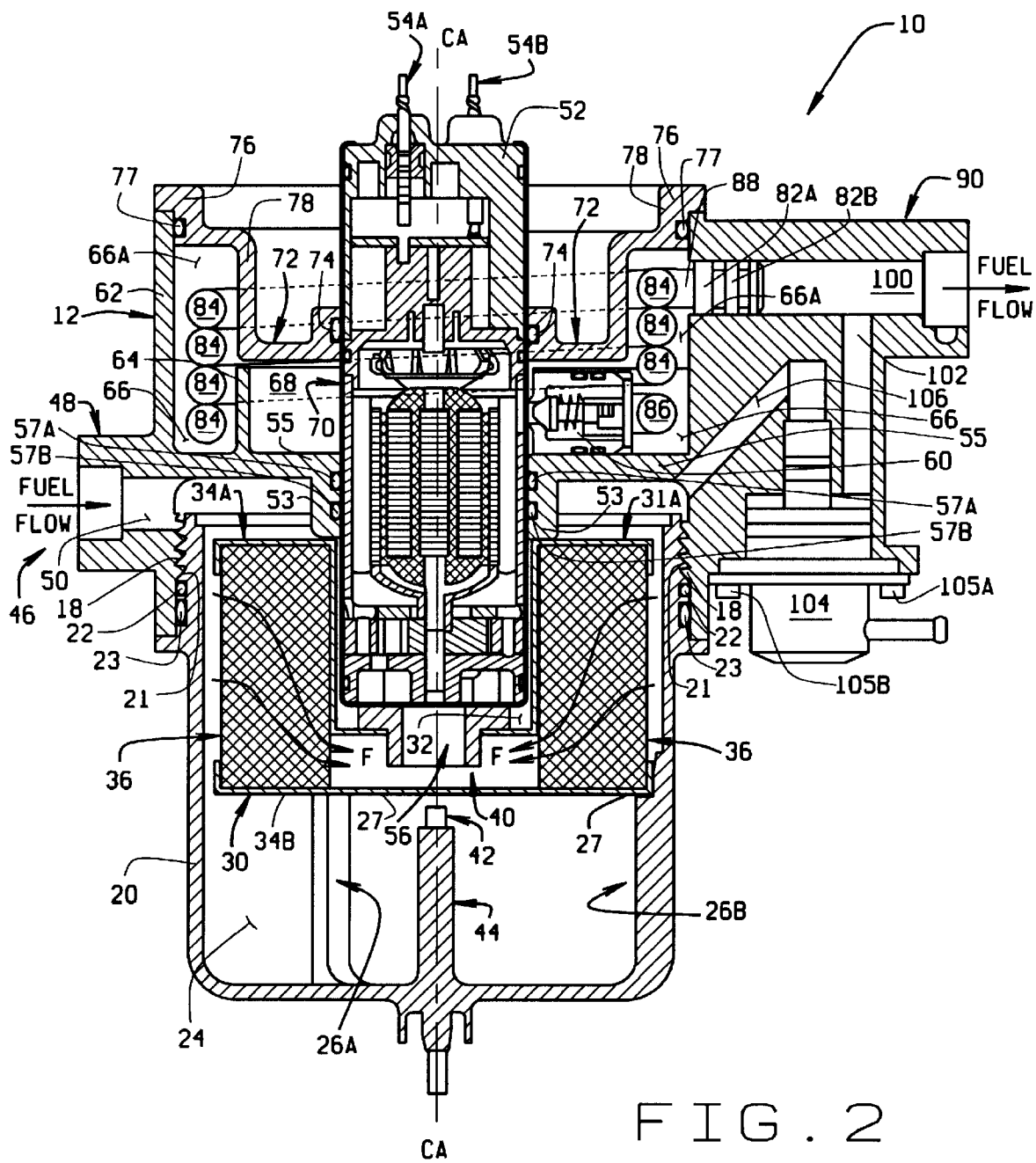
FIG. 2 is a side elevation view of the integrated fuel system component of the present invention taken along line 2—2 in FIG. 1, illustrating the internal components of the fuel pump.
Figure 3:
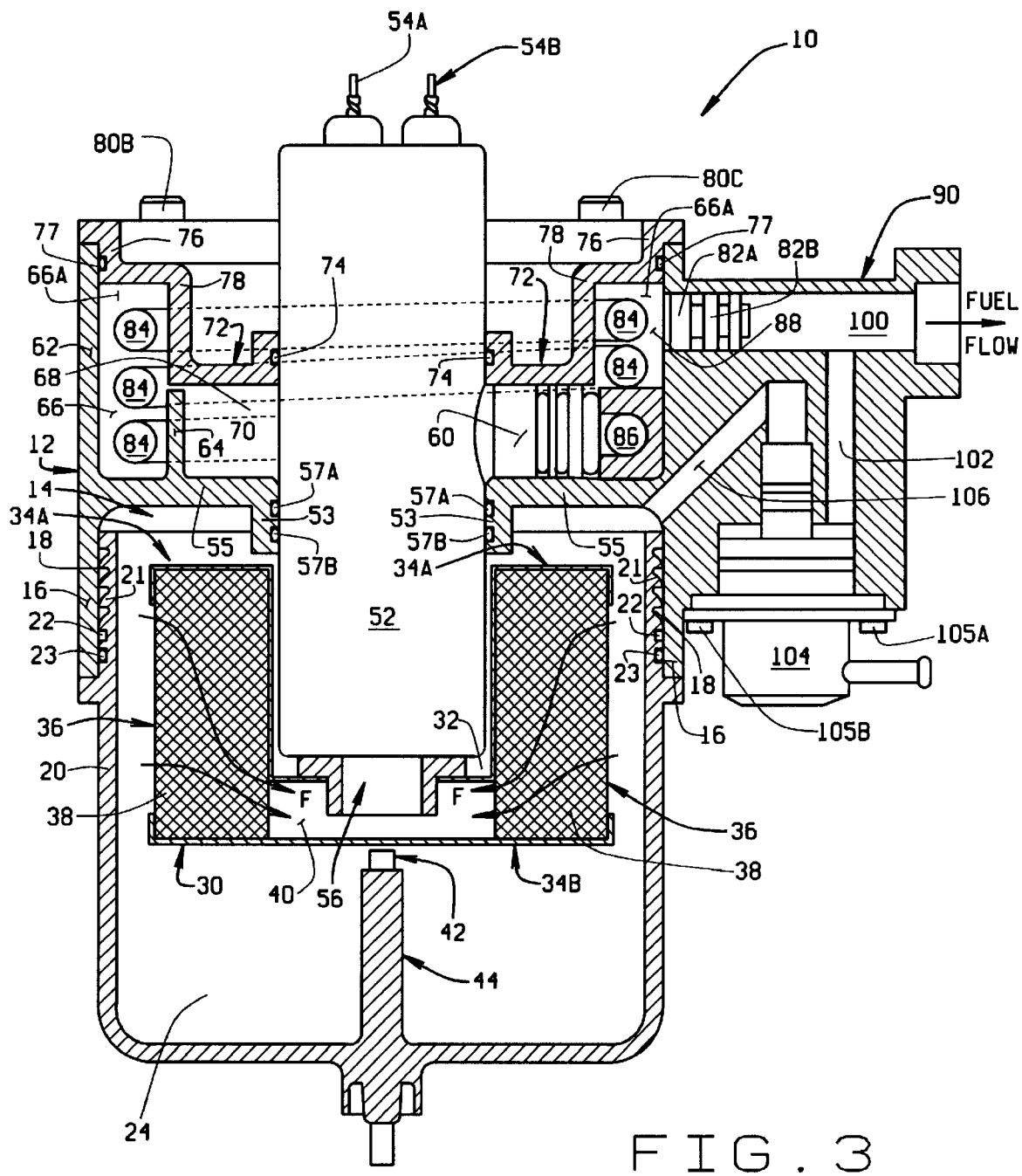
FIG. 3 is a sectional view of a second embodiment of the integrated fuel system component of the present invention taken along line 3—3 in FIG. 1, illustrating an alternate fuel line winding.

Referring now to the drawings, and to FIGS. 2 and 3 in particular, the preferred embodiment of the integrated fuel system component of the present invention is shown generally at 10, and incorporates a main body 12 having a generally cylindrical shape. The main body includes a cylindrical enclosure 14 formed by the main body and a downwardly flange 16 depending from the main body. The inner surface of cylindrical flange 16 is threaded as is indicated at 18 to receive a lower cup 20, having corresponding threads 21 for the lower cup to be threadedly received onto he main body. Two O-ring seals, 22 and 23, positioned in annular receiving grooves formed adjacent threads 21, form a fluid tight seal between lower cup 20 and main body 12.

The lower cup defines a cavity 24 and, in the preferred embodiment, includes three seat flanges, two of which are shown as indicated at 26A–26B, extending upward from the base of the lower cup, and equidistantly spaced along the interior surface. Each seat flange terminates at a horizontal shoulder 27, so to define a surface against which a cylindrical fuel filter 30 is seated coaxially with the lower cup, and apart from the interior surface of the lower cup. The fuel filter includes a hollow core 32, and fluid impervious upper and lower surfaces 34A and 34B, such that any fuel passing through the filter is directed radially inwardly along flow lines F shown in FIGS. 2 and 3. Fuel filter 32 is a conventional filter element, with open sides 36, a cylindrical filter material 38, and a central chamber 40 into which filtered fuel is directed. One skilled in the art will recognize that numerous filter elements may be employed. The volume of space within the lower cup and below fuel filter 30 forms a fuel reservoir within which fuel is temporarily retained prior to passing through the fuel system. Centrally disposed in the base of the lower cup is a water sensor 42 mounted in a columnar extension 44 extending upward into cavity 24.

Fuel from a fuel inlet port 46 formed in main body 12, adjacent the upper end of flange 16, flows into the fuel reservoir and fuel filter. The fuel inlet port comprises a short tubular extension 48 of the main body for receiving fuel line (not shown), and an axial passage 50 in fluid communication with the fuel reservoir and cavity 24. As shown in FIG. 2 and 3, fuel entering the fuel inlet port 46 is drawn through the fuel filter 32 and into central chamber 40.

Fuel is drawn from cavity 24 end the fuel reservoir, through fuel filter 32, and into central chamber 40 by means of a fuel pump 52 mounted within an axial bore in main body 12. The fuel pump is a conventional element and is not described in detail. Those skilled in the art will recognize that various fuel pump units may be employed within the scope of the invention to draw the fuel through the fuel filter and force it into an internal combustion engine (not shown). The bore in which fuel pump 52 is mounted is defined by an annular flange 53 extending downward from a base 55 of main body 12. A pair of O-ring seals, 57A an 57B are seated within annular grooves formed in an inner surface of annular flange 53, and seal the upper portions of the integrated fuel system component 10 from fuel present in lower cup 20.

Fuel pump 52 is an electrical pump and has terminal connectors 54A, 54B located on its upper surface for connection to an electrical power supply (not shown). The fuel pump is mounted axially along a common axis CA with fuel filter 32 and lower cup 20. A fuel pump inlet port 56 is located on the lower surface of the fuel filter for fluid communication with central chamber 40 of fuel filter 32. The lower surface of the fuel pump seats against the roof of central chamber 40, preventing fuel from bypassing the fuel filter prior to being drawn into inlet port 56. Fuel drawn into fuel pump 52 through the inlet port is pressurized by fuel pump, and exits the fuel pump through a lateral outlet port 60 located approximately midway along the length of the fuel pump, above base 55 of main body 12.

Main body 12 of integrated fuel system component 10 further includes a pair of concentric cylindrical flanges 62 and 64 extending upwardly from main body base 55. Outermost concentric flange 62 defines an outer wall of main body 12, and extends upwardly a distance approximately equal to three-quarters the length of that portion of fuel pump 52 extending above base 55. Second concentric flange 64, disposed radially inward from the outermost concentric flange, extends upwardly for approximately one-half the height of the outermost concentric flange, defines a pair of annular channels 66 and 68, concentric with central axis CA. Channel 66 is defined by flange 62 and 64, and channel 68 by flange 64 and exterior surface 70 of fuel pump 52.

Seated on the upper surfaces of first and second concentric cylindrical flanges 62 and 64, a cover 72 encloses annular channels 66 and 68, and surrounds exterior surface 70 of fuel pump 52. The cover is sealed against exterior surface 70 by an O-ring 74 or similar sealing element disposed in an annular groove. The O-ring forms a fluid-tight seal between the two. Similarly, a first recessed shoulder 76 in cover 72 is sealed against the interior surface of outermost concentric flange 62 by an O-ring 77 or similar sealing element. A second shoulder 78, disposed radially inwardly of first recessed shoulder 76, encloses annular channel 66, and defines a vertically elongated annular area 66A. Cover 72 is preferably secured to main body 12 by four retaining screws 80A–80D, which pass through radially outboard flanges 82A–82D, respectively, in the upper surface of the cover. The screws are secured within threaded bores (not shown) in the main body.

Vertically wound within area 66A and annular channel 66 is a helical fuel line 84. The helical fuel line is secured in fluid communication at a first end 86 to outlet port 60, and at a second end 88 to a fuel outlet 90 of main body 12. As is seen in comparison of FIGS. 2 and 3, helical fuel line 84 is formed with a different numbers of loops to very the fuel cooling capacity of the system; and as such, fuel cooling systems with greater or fewer numbers of loops from those shown in FIGS. 2 and 3 are considered within the scope of this invention. Formed from a single length of heat-conductive material, the helical fuel line is secured by clearance fit within fuel outlet 90, and is sealed by a pair of O-ring seals 92A and 92B. Fuel exiting the helical fuel line is forced through a central bore 100 of fuel outlet 90, and into the fuel rail (not shown) of the associated internal combustion engine.

A perpendicular passage 102, in fluid communication with central bore 100, connects to a vacuum operated pressure regulator 104 of conventional design, secured to main body 12 by a pair of threaded retaining bolts 105A and 105B. The pressure regulator is further connected in one-way fluid communication with the fuel reservoir and cavity 24 of the lower cup, by an angled passage 106, such that any over-pressured fuel in the fuel rail and central bore 100 is reticulated through the fuel filter, fuel pump, and helical fuel line. This avoids any fuel loss and reduces the risk of vapor lock.

To remove any excess heat from integrated fuel system component 10 (generated by the fuel pump) and to cool the fuel prior to injection into the fuel rail of the engine, helical fuel line 84 and exterior surface 70 of the fuel pump are bathed in a liquid coolant (not shown) circulated through area 66A, annular channel 66, and annular channel 68. The liquid coolant is introduced into the vertically elongated annular area 66A through a coolant inlet 94 formed in main body 12. The coolant circulates from area 66A through a coolant outlet 96 after absorbing excess heat from helical fuel line 84 and fuel pump 52. Due to the absence of a fluid-impervious seal between annular channel 66 and annular channel 68, the liquid coolant flows from the first annular channel into the second annular channel, absorbing excess heat from exterior surface 70 of fuel pump 52 as it passes.

In the preferred embodiment, coolant inlet 94 and coolant outlet 96 are in fluid communication with a coolant circulation system of the associated liquid cooled internal combustion engine, such that the engine coolant circulates through the integrated fuel system component of the present invention. One skilled in the art will recognize that the integrated fuel system component 10 may be readily adapted for use with a variety of external cooling systems, and may operate with either fresh-water or sea-water as a liquid coolant, or with a variety of heat-absorbing fluids commonly used as liquid coolants.

Operation of the integrated fuel system component 10 of the present invention is briefly described as follows. Fuel drawn from a fuel tank enters the fuel system component through fuel inlet port 46, and is deposited within lower cup cavity 24, filling the cavity above the lower level of fuel filter 32. Fuel is then drawn radially inward through the fuel filter by operation of fuel pump 52, passing through central chamber 40 of the fuel filter and into fuel pump inlet port 56. Fuel within the pump is pressurized flow through helically-wound fuel line 84, and out of component 10 into an associated fuel rail. Simultaneously, a liquid coolant is circulated through the upper portions of integrated fuel system component 10, around helically-wound fuel line 84 and exterior surface 70 of fuel pump 52, absorbing any excess heat generated by fuel pump. The liquid coolant is continually flushed through the system, dissipating the absorbed heat into the associated engine coolant system or other coolant means to which the system is connected. By continually circulating fresh coolant through the system, the overall operating temperature of the system is reduced, minimizing the risk of vapor lock due to heated fuel in the fuel rail, and extending the operating life of the fuel pump by reducing the pump operational temperatures.

In view of the above, it will be seen that the several objects of the invention are achieved and other advantages results are obtained. As various changes could be made in the above constructions without departing from the scope of the invention, it is intended that all matter contained in the above description or shown in the accompanying drawings shall be interpreted as illustrative and not in a limiting sense.

We claim:

1. An integrated fuel system component for use with internal combustion engines, comprising:

a housing in which is defined a fuel inlet, a fuel outlet, and a plurality of interconnected chambers therebetween, said housing including a vertically aligned cylindrical main body having an upper recess and a lower recess, said main body including an axial bore interconnecting said upper and lower recesses, a fuel reservoir threadedly connected to said main body adjacent said lower recess, said fuel reservoir enclosing said lower recess, and a cover plate secured to said main body adjacent said upper recess, said cover plate enclosing said upper recess and having an axial bore aligned with said main body axial bore;

a fuel filter mounted in said housing in fluid communication with said fuel inlet;

a fuel pump mounted in said housing coaxially with said fuel filter, said fuel pump drawing fuel through said fuel filter through said interconnected chambers, and said fuel pump pressurizing said fuel;

an internal fuel line mounted in said housing for delivering pressurized fuel from said fuel pump to said fuel outlet; and a fuel cooling system formed integral with said housing, said fuel cooling system circulating a liquid coolant adjacent to said fuel pump, said interconnected chambers, and said internal fuel line.

2. An integrated fuel system component for use with an internal combustion engine, comprising:

a housing in which is defined a fuel inlet and a fuel outlet with a plurality of interconnected chambers therebetween, said housing including a vertically aligned main body having an upper and a lower recess formed therein with a bore interconnecting said recesses, a fuel reservoir connected to said main body adjacent said lower recess and enclosing said lower recess, and a cover plate secured to said main body adjacent the upper recess and enclosing said upper recess;

a fuel filter mounted in said housing in fluid communication with said fuel inlet;

a fuel pump mounted in said housing with said fuel filter and drawing fuel through said fuel filter through said interconnected chambers, and said fuel pump pressurizing said fuel;

a fuel line internal of said housing for delivering pressurized fuel from said fuel pump to said fuel outlet; and a fuel cooling system integrally formed with said housing for circulating a liquid coolant adjacent to said fuel pump, said interconnected chambers, and said internal fuel line.

3. The integrated fuel system component of claim 2 wherein said main body is a cylindrically shaped body having an axial bore interconnecting said upper and lower recesses.

4. The integrated fuel system component of claim 3 wherein said fuel reservoir is threadedly connected to said main body adjacent said lower recess to enclose said lower recess.

5. The integrated fuel system component of claim 4 wherein said cover plate is secured to said main body adjacent said upper recess to enclose said upper recess.

6. The integrated fuel system component of claim 5 wherein said cover plate has a bore axially aligned with said bore in said main body.

7. The integrated fuel system component set of claim 1 further including:
   a fuel inlet in said main body in fluid communication with said fuel reservoir;
   a fuel outlet in said main body in fluid communication with said internal fuel line;
   a coolant inlet in said main body in fluid communication with said enclosed upper recess; and
   a coolant outlet in said main body in fluid communication with said upper recess.

8. The integrated fuel system component set forth in claim 1 wherein said fuel filter is coaxially mounted within said fuel reservoir, said fuel filter including an internal chamber within which said fuel pump seats and fuel is drawn radially inward thereinto.

9. The integrated fuel system component set forth in claim 1 wherein said internal fuel line is disposed within said upper recess, said liquid coolant circulating around said internal fuel line.

10. The integral fuel system component of claim 9 wherein said internal fluid line is helically wound within said upper recess, concentric with said axial bore and said fuel pump.

11. The integrated fuel system component set forth in claim 1 wherein said fuel pump is axially disposed within said main body axial bore and said cover axial bore, defining an inner wall of said upper recess, said fuel pump seated within said fuel filter and interconnected to said internal fuel line.

12. The integrated fuel system component set forth in claim 1 further including a fuel pressure regulator interconnected to said fuel outlet and said fuel reservoir.

13. The integrated fuel system component of claim 12 wherein said fuel pressure regulate is configured to discharge fuel from said fuel outlet into said fuel reservoir.

* * * * *